(12) United States Patent
Dölker

(10) Patent No.: US 8,443,766 B2
(45) Date of Patent: May 21, 2013

(54) METHOD FOR AUTOMATICALLY CONTROLLING AN INTERNAL COMBUSTION ENGINE

(75) Inventor: Armin Dölker, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 1057 days.

(21) Appl. No.: 12/316,890

(22) Filed: Dec. 17, 2008

(65) Prior Publication Data

US 2009/0151659 A1   Jun. 18, 2009

(30) Foreign Application Priority Data

Dec. 17, 2007   (DE) .................. 10 2007 060 670

(51) Int. Cl.
*F01P 7/02* (2006.01)
*F01P 5/14* (2006.01)
*F02B 77/08* (2006.01)

(52) U.S. Cl.
USPC ............... 123/41.15; 123/41.1; 123/41.13; 123/198 D

(58) Field of Classification Search
USPC .......... 123/352, 563, 357, 435, 445, 688, 123/479, 198 D, 41.1, 41.13, 41.15; 701/108, 701/114; 340/507
See application file for complete search history.

(56) References Cited

U.S. PATENT DOCUMENTS

| | | | | |
|---|---|---|---|---|
| 4,213,180 A | * | 7/1980 | Marchak et al. | 701/114 |
| 4,615,321 A | * | 10/1986 | Haefner et al. | 123/479 |
| 5,003,954 A | * | 4/1991 | Yakuwa et al. | 123/479 |
| 5,153,835 A | * | 10/1992 | Hashimoto et al. | 701/114 |
| 6,863,051 B2 | | 3/2005 | Doelker et al. | |

FOREIGN PATENT DOCUMENTS

| | | |
|---|---|---|
| DE | 10032110 | 1/2002 |
| DE | 10223686 | 12/2003 |
| DE | 20122420 | 8/2005 |
| DE | 102007056360 | 6/2009 |
| EP | 1071869 | 6/2004 |
| JP | 10153125 A * | 6/1998 |

OTHER PUBLICATIONS

Magazine:Schiff & Hafen/Kommandobrucke, Heft Jan. 1, 1990 Article: MTU-Baureihe 396 mit Mischkreislauf pp. 49 & 50 Country: Germany.

* cited by examiner

*Primary Examiner* — Noah Kamen
(74) *Attorney, Agent, or Firm* — Lucas & Mercanti, LLP; Klaus P. Stoffel

(57) ABSTRACT

A method for automatically controlling an internal combustion engine, where, during normal operation in a first controller mode, a charge air temperature controller is set as dominant for a map-controlled thermostatic valve for automatically controlling the charge air temperature (TLL), or, during normal operation in a second controller mode, a coolant temperature limit controller is set as dominant for the map-controlled thermostatic valve for automatically controlling the coolant temperature (TKM). If a charge air temperature sensor fails, the second controller mode is set with the coolant temperature limit controller dominant, and if a coolant temperature sensor fails, the first controller mode is set with the charge air temperature controller dominant.

7 Claims, 6 Drawing Sheets

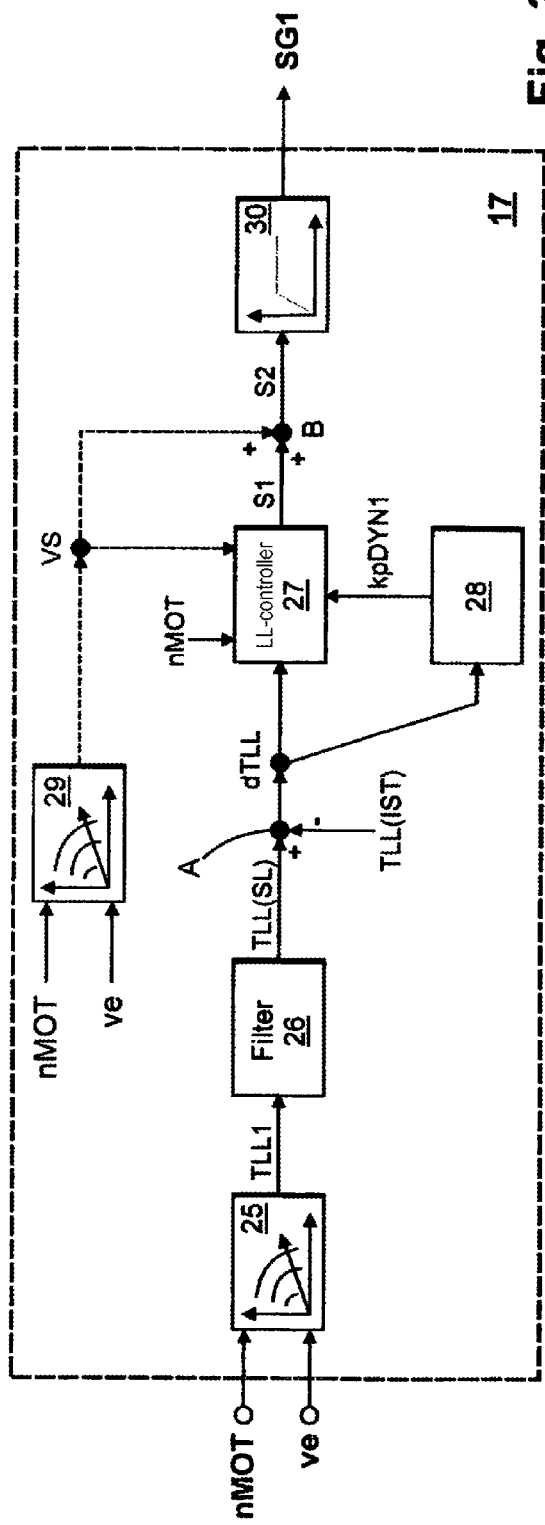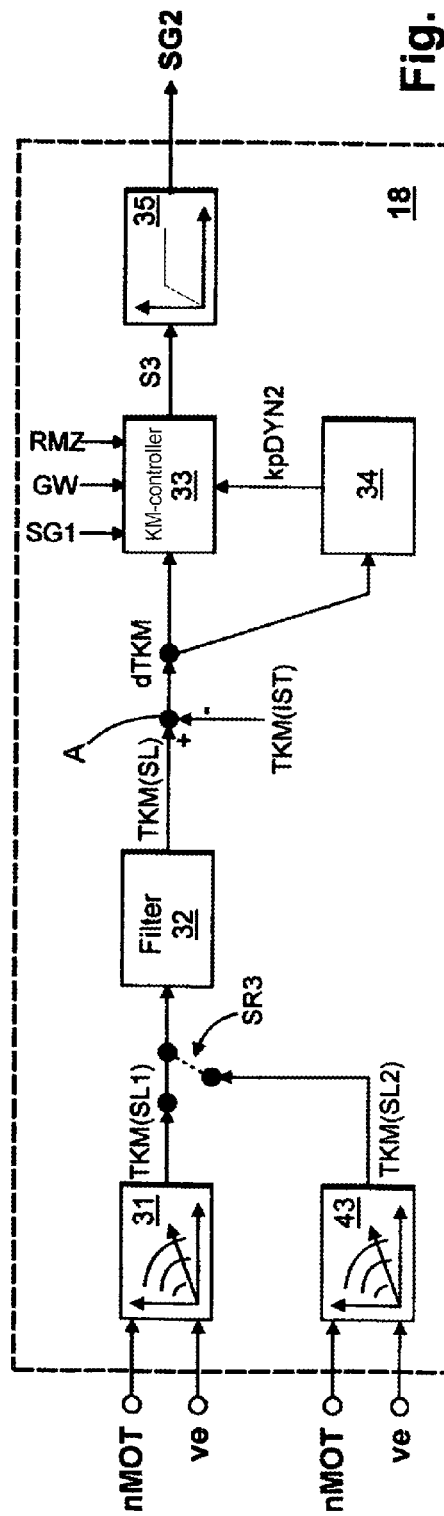

METHOD FOR AUTOMATICALLY CONTROLLING AN INTERNAL COMBUSTION ENGINE

BACKGROUND OF THE INVENTION

The invention concerns a method for automatically controlling an internal combustion engine, where, during normal operation in a first controller mode, a charge air temperature controller is set as dominant for a map-controlled thermostatic valve for automatically controlling the charge air temperature, or, during normal operation in a second controller mode, a coolant temperature limit controller is set as dominant for the map-controlled thermostatic valve for automatically controlling the coolant temperature, where if a charge air temperature sensor fails, the second controller mode is set with the coolant temperature limit controller dominant, and where if a coolant temperature sensor fails, the first controller mode is set with the charge air temperature controller dominant.

A cooling circulation system of an internal combustion engine is known from the journal Schiff & Hafen/Kommandobrücke, No. 1, 1990, pp. 49-50. The cooling circulation consists of a high-temperature circulation with a coolant pump and a low-temperature circulation that branches off from the high-temperature circulation. In the low-temperature circulation, a thermostatic valve, a recooler with a bypass line, a charge air cooler, and a lubricating oil heat exchanger are arranged in series. The coolant flow in the low-temperature circulation diverted from the high-temperature circulation is divided by the position of the thermostatic valve into a recooler coolant flow, which flows through the recooler, and a bypass coolant flow. Downstream of the recooler, the two coolant flows are brought together again and fed to the charge air cooler as the charge air cooler coolant flow. The thermostatic valve thus determines the temperature of the charge air cooler coolant flow via the distribution of the coolant flow. The temperature of the charge air cooler coolant flow in turn defines, via the temperature difference from the charge air temperature, the amount of heat extracted from the charge air in the charge air cooler. For example, when the internal combustion engine is under full load, the thermostatic valve is completely open, so that the entire coolant flow of the low-temperature circulation flows through the recooler, and therefore the greatest possible amount of thermal energy is extracted from the charge air. By contrast, when the internal combustion engine is idling, the thermostatic valve is completely closed, so that the entire coolant flow of the low-temperature circulation flows through the bypass line, and very little thermal energy is extracted from the charge air. The switching state of the thermostatic valve is determined by a thermostatic operating element, for example, an expanding material element, which expands with increasing temperature of the coolant flow, so that the thermostatic valve opens, or contracts with decreasing temperature of the coolant flow, so that the thermostatic valve closes under spring tension. Due to the design of the thermostatic valve, automatic control of the charge air temperature is still not possible at all operating points.

DE 201 22 420 U1 discloses an electrically heated thermostatic valve in which the characteristic curve of the thermostatic operating element can be shifted by the electric control of the heating element. For example, when an internal combustion engine is cold, and a large load is demanded, the coolant flow can be influenced by the bypass line at an earlier time than would be possible by the thermostatic operating element. In the remainder of the text, a thermostatic valve of this type will be referred to as a map-controlled thermostatic valve. DE 102 23 686 A1 discloses a corresponding method for controlling this map-controlled thermostatic valve. It describes two-position control with input control of the operating element. However, this method does not offer significant improvement with respect to the automatic control of the charge air temperature in the coolant circulation described above.

The unprepublished German patent application with the official file number DE 10 2007 056 360.6 describes a method for automatically controlling the charge air temperature or the coolant temperature by a map-controlled thermostatic valve in the cooling circulation system described above. In a first controller mode, a charge air temperature controller is set as dominant for the map-controlled thermostatic valve to automatically control the charge air temperature. In a second controller mode, a coolant temperature limit controller is set as dominant for the map-controlled thermostatic valve to automatically control the coolant temperature. Under normal operating conditions, the charge air temperature is determined over the entire operating range of the internal combustion engine by the charge air temperature controller. However, if the coolant temperature rises to an impermissible level, the coolant temperature limit controller becomes dominant. Basically, the controller which would be able to provide stronger cooling is the one which is set as dominant for the map-controlled thermostatic valve. Measures to be taken in the event of a sensor failure, for example, the charge air temperature sensor and/or the coolant temperature sensor, are not indicated in the cited document.

DE 100 32 110 A1 discloses a diagnostic function for a closed-loop control structure with a speed controller and a torque limiter, which act on the same actuator. However, the diagnostic function considers only the case of the occurrence of an error in the torque determination. Practically speaking, in this method, during normal operation, either the speed controller or the torque limiter is set as dominant for a power-determining signal, for example, an injection quantity. If the diagnostic function detects an error in the torque determination, then, if the speed controller is dominant, it remains dominant. If, on the other hand, the torque limiter is dominant, dominance then passes to the speed controller. The cited document fails to describe what procedure is followed if an error occurs in the speed determination.

SUMMARY OF THE INVENTION

The object of the present invention is to supplement the previously described method for automatically controlling the charge air temperature or the coolant temperature with respect to a procedure in the event of a sensor failure.

This objective is achieved by a method, where, during normal operation in a first controller mode, a charge air temperature controller is set as dominant for a map-controlled thermostatic valve for automatically controlling the charge air temperature, or, during normal operation in a second controller mode, a coolant temperature limit controller is set as dominant for the map-controlled thermostatic valve for automatically controlling the coolant temperature, and where if the charge air temperature sensor fails, the second controller mode is set with the coolant temperature limit controller being dominant. If, on the other hand, the coolant temperature sensor fails, the first controller mode is set with the charge air temperature controller dominant. The central idea of the invention is thus to set whichever controller is not defective as the determining controller.

In the event of total failure of the controlled variable determination, i.e., in the event of failure of both the charge air temperature sensor and the coolant temperature sensor, complete opening of the map-controlled thermostatic valve is effected. For this purpose, a set thermostat displacement is set to an emergency value. The set thermostat displacement is then used to calculate a maximum control signal for acting on the map-controlled thermostatic valve. The maximum cooling capacity is adjusted by the completely opened map-controlled thermostatic valve, so that the internal combustion engine is protected from overheating, even in emergencies.

If the charge air temperature sensor fails, while the coolant temperature sensor remains intact, it is provided that a change be made from a first engine map to a second engine map for the determination of a set coolant temperature. In contrast to the first engine map, the second engine map is not furnished with maximum values but rather is designed with an eye to secure, steady-state, automatically controlled operation. The set coolant temperatures of the second engine map are dimensioned in such a way that the charge air temperature on failure of the charge air temperature sensor during steady-state operation ideally agrees with the values of the engine map for determining the set charge air temperature.

Other features and advantages of the present invention will become apparent from the following description of the invention.

BRIEF DESCRIPTION OF THE DRAWINGS

FIG. 3 shows a block diagram for the automatic charge air temperature control.
FIG. 4 shows a block diagram for the automatic coolant temperature control.

DETAILED DESCRIPTION OF THE INVENTION

Figure 1:
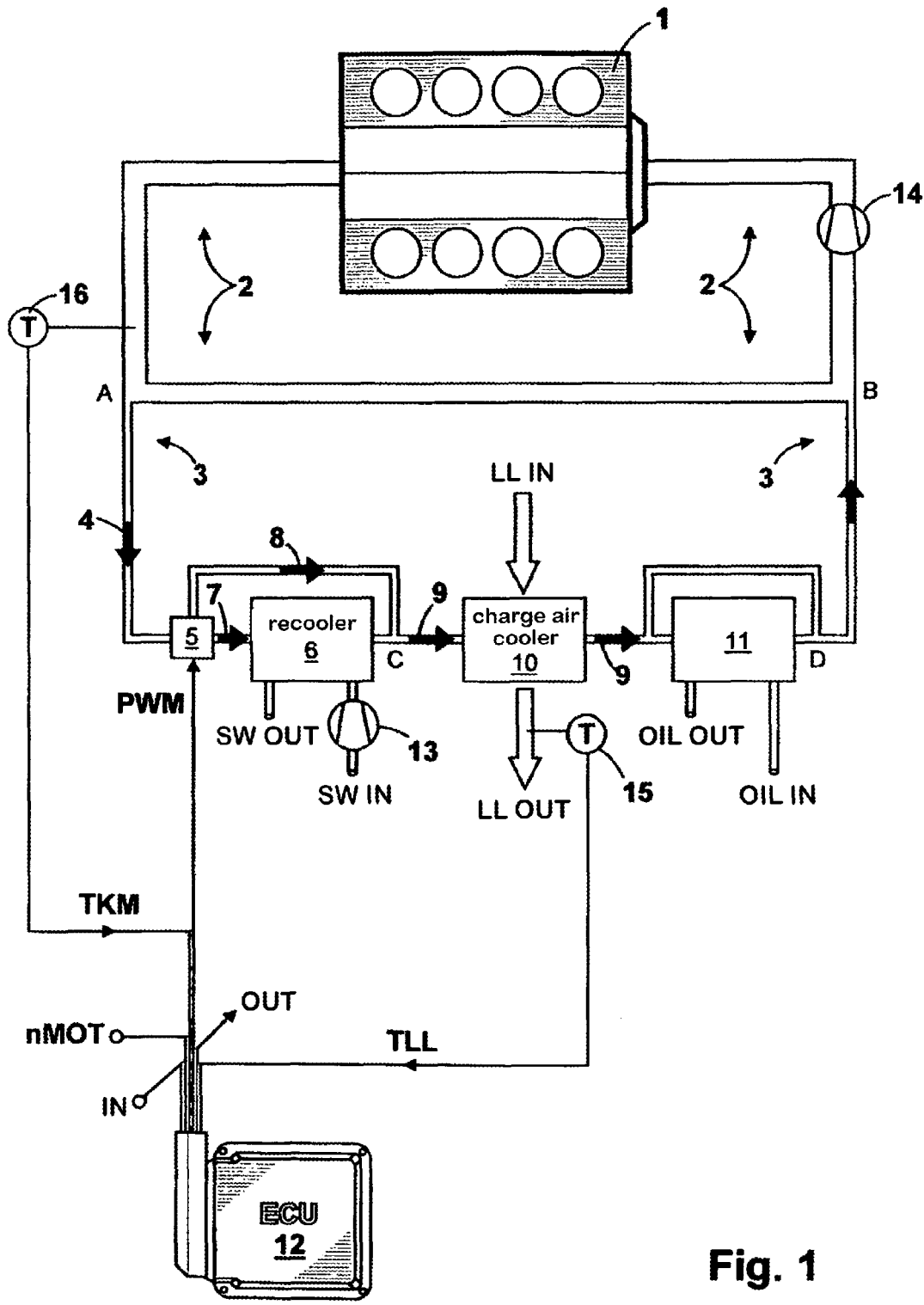
FIG. 1 shows a system diagram.

FIG. 1 shows a system diagram. The coolant circulation for cooling the internal combustion engine 1 comprises a high-temperature circulation 2 with a coolant pump 14 and a low-temperature circulation 3. The low-temperature circulation 3 branches off from the high-temperature circulation 2 at a point A and reenters the high-temperature circulation 2 at a point B. The coolant flow in the high-temperature circulation 2 and in the low-temperature circulation 3 is adjusted by a throttle point (not shown) in the high-temperature circulation 2. The coolant flow in the low-temperature circulation 3 after the split (point A) from the high-temperature circulation 2 is labeled in the drawing as coolant flow 4. A map-controlled thermostatic valve 5, a recooler 6 with a bypass line, a charge air cooler 10, and a lubricating oil heat exchanger 11 with a bypass line are arranged in series in the low-temperature circulation 3. The coolant flow 4 is distributed as a function of the position of the map-controlled thermostatic valve 5 to a recooler coolant flow 7 and/or a bypass coolant flow 8. When the map-controlled thermostatic valve 5 is completely closed, the entire coolant flow 4 is carried past the recooler 6 through the bypass line. When the map-controlled thermostatic valve 5 is completely open, the entire coolant flow 4 flows through the recooler 6. In the recooler 6, heat is transferred from the recooler coolant flow 7 to the seawater, so that the recooler coolant flow 7 is cooled. The seawater is supplied by its own seawater pump 13. After it flows through the recooler 6, the seawater is returned. In FIG. 1, the seawater supply is denoted SW In and the seawater return is denoted SW Out.

At a point C, the recooler coolant flow 7 and the bypass coolant flow 8 are brought back together. This corresponds to the charge air cooler coolant flow 9, whose temperature is determined by the volume fractions and temperatures of the recooler coolant flow and the bypass coolant flow. The charge air cooler coolant flow 9 then flows through the charge air cooler 10, in which heat is transferred from the charge air to the charge air cooler coolant flow 9, which causes strong cooling of the charge air. The charge air is supplied by the compressor of an exhaust gas turbocharger (not shown). After is flows through the charge air cooler 10, the charge air is supplied to the combustion chambers of the internal combustion engine 1. In FIG. 1, the charge air supply is denoted LL In and the charge air return is denoted LL Out. The heated charge air cooler coolant flow 9 then flows through the lubricating oil heat exchanger 11, in which heat is transferred from the lubricant to the charge air cooler coolant flow 9, thereby cooling the lubricant. In FIG. 1, the lubricant supply is denoted Oil In and the lubricant return is denoted Oil Out. A portion of the charge air cooler coolant flow 9 is conveyed past the lubricating oil heat exchanger 11 by a bypass line. At a point D, the two volumes are brought back together again, and the combined flow is then fed back into the high-temperature circulation 2 at point B.

Reference number 12 denotes an electronic engine control unit (ECU), which determines the behavior of the internal combustion engine 1. The electronic engine control unit 12 contains the usual components of a microcomputer system, for example, a microprocessor, interface adapters, buffers, and memory components (EEPROM, RAM). Operating characteristics that are relevant to the operation of the internal combustion engine 1 are applied in the memory components in the form of engine maps/characteristic curves. The electronic engine control unit 12 uses these to compute the output variables from the input variables. FIG. 1 shows the following input variables as examples: the engine speed nMOT, a charge air temperature TLL (raw values), which is measured by a temperature sensor 15, a (high-temperature circulation) coolant temperature TKM, which is measured by a temperature sensor 16, and an input variable IN. Examples of input variables IN are a rail pressure of the common rail system and a power demand made by an operator. As output variables of the electronic engine control unit 12, FIG. 1 shows a signal PWM for controlling the map-controlled thermostatic valve 5 and an output variable OUT. The output variable OUT is representative of additional control signals for the open-loop and closed-loop control of the internal combustion engine 1, for example, a control signal for the start or end of injection and a signal for controlling a suction throttle in a common rail system.

Figure 2:
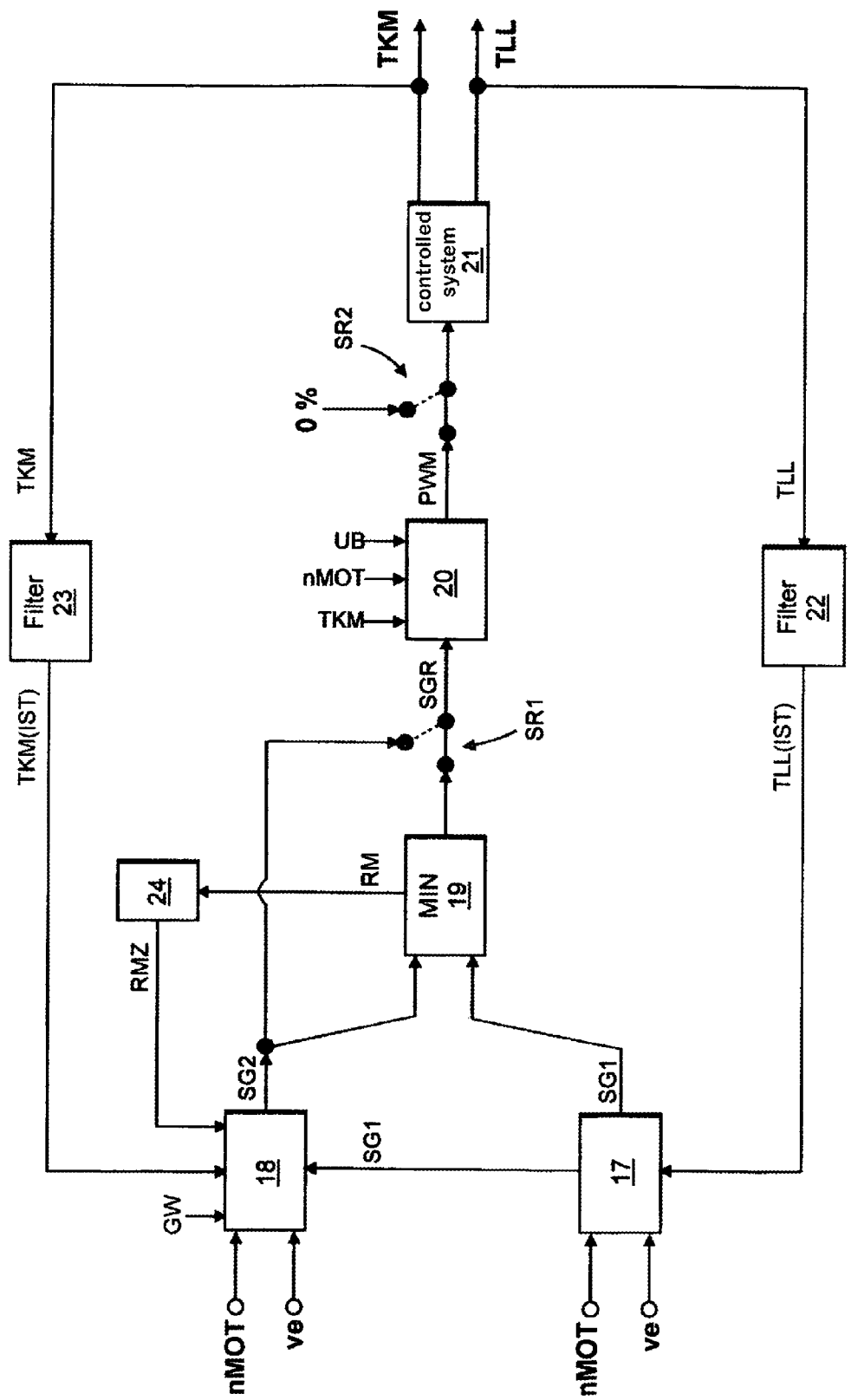
FIG. 2 shows a closed-loop system for automatic charge air temperature control or coolant temperature control.
Figure 5:
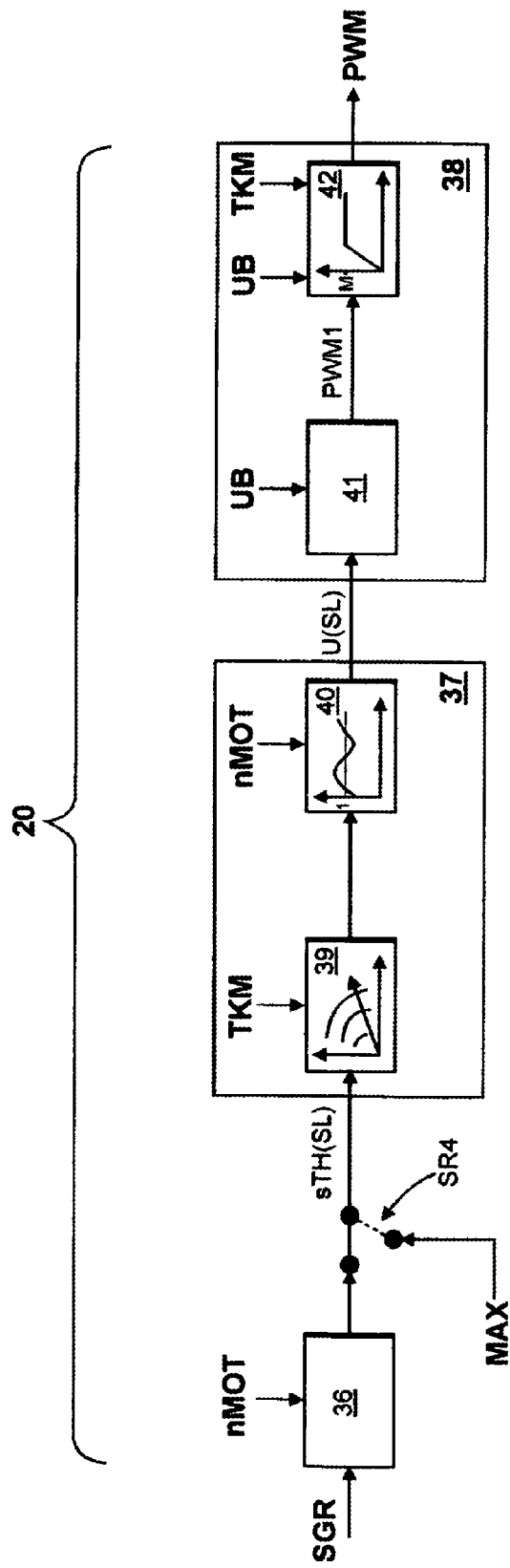
FIG. 5 shows a block diagram of the computing unit.

FIG. 2 shows a closed-loop control system for automatically controlling the charge air temperature or coolant temperature in the cooling circulation system of FIG. 1. The input variables of the closed-loop control system are the engine speed nMOT, a power-determining signal ve, a limiting value GW, and the battery voltage UB. The power-determining signal ve corresponds to a set torque in an automatic engine control system based on torque or to a set injection quantity in an automatic engine control system based on injection quantity. The output variables of the closed-loop control system are the charge air temperature TLL and the coolant temperature TKM. The elements of the closed-loop control system are: a unit 17 for determining a first correcting variable SG1, a unit 18 for determining a second correcting variable SG2, a minimum value selector 19, a first switch SR1, a computing unit 20, a second switch SR2, and the controlled system 21. The output variables of the controlled system 21 represent the controlled variables, which in this case are: the raw values of the charge air temperature TLL and the raw values of the (high-temperature circulation) coolant temperature TKM. The determination of the set charge air temperature, the determination of the charge air temperature control deviation, the charge air temperature controller, and a limiter are integrated in the unit 17. The unit 17 is shown in FIG. 3 as a block diagram and will be explained in connection with FIG. 3. The determination of the set coolant temperature, the determination of the coolant temperature control deviation, the coolant temperature limit controller, and a limiter are integrated in the unit 18. The unit 18 is shown in FIG. 4 as a block diagram and will be explained in connection with FIG. 4. The conversion of a resultant correcting variable SGR into a control signal PWM is integrated in the computing unit 20. The control signal PWM acts on the map-controlled thermostatic valve 5 in the controlled system 21. The computing unit 20 is shown in FIG. 5 as a block diagram and will be explained in connection with FIG. 5. The controlled system 21 comprises the map-controlled thermostatic valve 5, the recooler 6 with bypass line, and the charge air cooler 10. The raw values of the charge air temperature TLL are filtered by an optional filter 22, which is incorporated in a first feedback path. The filtered values represent the actual charge air temperature TLL(IST), which is sent to the unit 17. The raw values of the coolant temperature TKM are filtered by an optional filter 23, which is incorporated in a second feedback path. The filtered values represent the actual coolant temperature TKM(IST), which is sent to the unit 18. The controller mode RM, delayed by a scanning step, is fed back via a dead-time element 24 to the unit 18 as a delayed controller mode RMZ. The controller mode RM stands for the first controller mode RM1 or the second controller mode RM2.

The illustrated closed-loop control system in the drawing has the following functionality:

When the engine is shut down, the second switch SR2 is in the position indicated by the broken line, in which the constant value 0% is sent to the controlled system. In this state, the map-controlled thermostatic valve is completely closed. After the engine has been started, the second switch SR2 changes to the position indicated by the solid line, in which the position of the map-controlled thermostatic valve is defined by the control signal PWM. During normal operation, the first switch SR1 is in the position indicated by the solid line. The minimum value selector 19 sets the controller whose correcting variable shows the smaller value as dominant for the map-controlled thermostatic valve. Therefore, the controller which would be able to provide stronger cooling is the one which prevails. In normal operation, the first correcting variable SG1 is less than the second correcting variable SG2, i.e., the first controller mode RM1 is set. In this controller mode, the charge air temperature controller, which is integrated in the unit 17, is dominant. Therefore, the value of the resultant correcting variable SGR corresponds to the value of the first correcting variable SG1. The computing unit 20 then uses the resultant correcting variable SGR to compute the control signal PWM for acting on the map-controlled thermostatic valve. The recooler coolant flow, which flows through the recooler, and the bypass coolant flow are determined as a function of the position of the map-controlled thermostatic valve. However, if the actual coolant temperature TKM(IST) approaches a set coolant temperature, the value of the second correcting variable SG2 falls below the value of the first correcting variable SG1. The minimum value selector 19 then sets the resultant correcting variable SGR to the value of the second correcting variable SG2, and the second controller mode RM2 is set. The coolant temperature limit controller, which is integrated in the unit 18, then takes control via the map-controlled thermostatic valve. Only when the actual coolant temperature TKM(IST) has fallen back below the permissible limit value GW due to strong cooling, can the charge air temperature controller again take control via the map-controlled thermostatic valve.

The following assignment thus applies for the resultant correcting variable SGR, by which the bypass coolant flow to be set is ultimately determined:

The value of the resultant correcting variable SGR corresponds to the value of the first correcting variable SG1 when the value of the first correcting variable SG1 is less than or equal to the value of the second correcting variable SG2. If the value of the second correcting variable SG2 is less than the value of the first correcting variable SG1, then the value of the resultant correcting variable SGR corresponds to the value of the second correcting variable SG2.

The following applies to the controller mode RM: The first controller mode RM1 is set if the resultant correcting variable SGR corresponds to the first correcting variable SG1. The second controller mode RM2 is set if the resultant correcting variable SGR corresponds to the second correcting variable SG2.

To ensure that the transition in dominance from the charge air temperature controller to the coolant temperature limit controller takes place quickly and without any problems, the I component of the coolant temperature limit controller in the first controller mode RM1, i.e., the mode in which the charge air temperature controller is dominant, is set to the value of the first correcting variable SG1. In FIG. 2, this is represented by a corresponding signal path from unit 17 to unit 18.

If a failure of the charge air temperature is detected, then, in a first step, the second controller mode RM2 is set, and, in a second step, the first switch SR1 is moved into the position indicated by the broken line. In this position of the first switch SR1, the resultant correcting variable SGR always corresponds to the second correcting variable SG2. The position of the map-controlled thermostatic valve is thus determined exclusively by the coolant temperature limit controller. In a third step, a switch is made from a first engine map to a second engine map for the determination of the set coolant temperature as a reference input for the coolant temperature limit controller. If a sensor defect is present, then the set value of the coolant temperature limit controller is changed from a maximum value to a practicable steady-state set value. This set value corresponds to the set value of the charge air temperature controller. In other words, if normal operation is present, i.e., if the charge air temperature sensor is intact, the charge air temperature is automatically controlled to a value that is dependent on the engine map. In this case, the coolant temperature is not controlled but rather is merely determined by the structure of the cooling circulation. These coolant temperatures that arise and thus correspond to the charge air temperature are entered in a second engine map for the computation of a second set coolant temperature (FIG. 4). Accordingly, the coolant temperatures involved here are the steady-state temperatures that arise during normal operation, i.e., with automatic control of the charge air temperature. In the event of a defective charge air temperature sensor, the functionality of the coolant temperature limit controller is not to limit the coolant temperature but rather to automatically control the coolant temperature. In a fourth step, the I component of the coolant temperature is no longer set but rather is only limited. i.e., it can run freely. In this regard, see the description of FIG. 4.

FIG. 3 shows a block diagram of the unit 17 for automatic charge air temperature control. The input variables are the engine speed nMOT, the power-determining signal ve, which corresponds to a set torque in an engine control system based on torque or to a set injection quantity in an engine control system based on injection quantity, and the actual charge air temperature TLL(IST). The output variable is the first correcting variable SG1, which stands for the bypass coolant flow to be set. The elements of the unit 17 are an engine map 25, an optional filter 26, the charge air temperature controller 27, a unit 28, an input control engine map 29, and a limiter 30. A first charge air temperature TLL1 is computed by the engine map 25 from the two input variables engine speed nMOT and power-determining signal ve. The first charge air temperature TLL1 is then filtered by the filter 26. The output signal corresponds to the set charge air temperature TLL(SL). At a point A, a charge air temperature control deviation dTLL is computed from the set charge air temperature TLL(SL) and the actual charge air temperature TLL(IST). The charge air temperature control deviation dTLL is the input variable of the charge air temperature controller 27. The charge air temperature controller 27 is preferably realized as a PI controller, but a PID controller or a PIDT1 controller would also be possible. To improve the controller dynamics, a proportional coefficient kp for computing the P component can also be computed as a function of the charge air temperature control deviation dTLL. In this case, the proportional coefficient kp is then computed from the sum of a predetermined, static proportional coefficient and a dynamic proportional coefficient kpDYN1. The dynamic proportional coefficient kpDYN1 is computed by the unit 28.

The output variable S1 of the charge air temperature controller 27 is optionally added with an input control value VS at a point B. The sum corresponds to the signal S2. The input control value VS is determined by an input control engine map 29 as a function of the engine speed nMOT and the power-determining signal ve. The addition at point B represents a disturbance-variable compensation and is meant to improve the dynamics of the open-loop control system. If input control is applied, then the I component of the charge air temperature controller 27 has a lower bound of the negative input control value VS. If no input control is provided, then the I component of the charge air temperature controller 27 has a lower bound of zero. With respect to the upper bound, the I component of the charge air temperature controller 27 is bounded above by the following value (WERT) as a function of the engine speed nMOT:

$$WERT=(nMOT \cdot VMAX)/nNENN \qquad \text{(formula 1)}$$

In this formula, nMOT represents the current engine speed, nNENN is a rated engine speed, and VMAX stands for a maximum bypass coolant flow.

The limiter 30 limits the value of the signal S2 below by zero and above according to formula 1. The upper limit determined by the limiter 30 thus corresponds to the label WERT. The output variable of the limiter 30 represents the first correcting variable SG1. It is identical to the bypass coolant flow that is to be adjusted, i.e., the set bypass coolant flow. The lower limit of the set bypass coolant flow is zero. The upper limit is computed by formula 1, in which WERT corresponds to the upper limit.

FIG. 4 shows a block diagram of the unit 18 for automatic coolant temperature control. The input variables are the engine speed nMOT, the power-determining signal ve, the actual coolant temperature TKM (IST), the first correcting variable SG1, the limiting value GW, and the time-delayed controller mode RMZ, which corresponds to the first controller mode RM1 delayed by a scanning step or to the second controller mode RM2. The output variable of the unit 18 is the second correcting variable SG2, which represents the set bypass coolant flow. The elements of the unit 18 are a first engine map 31, a second engine map 43, a third switch SR3, an optional filter 32, the coolant temperature limit controller 33, a unit 34 for computing a dynamic proportional coefficient, and a limiter 35.

If both the charge air temperature sensor and the coolant temperature sensor are nondefective, the third switch SR3 is in the position indicated by the solid line. A maximum coolant temperature is computed by an engine map 31 from the two input variables engine speed nMOT and power-determining signal ve. The maximum coolant temperature, which may not be exceeded, is stored in the engine map 31. It is referred to as the first set coolant temperature and is denoted TKM(SL1) in FIG. 4. It is then filtered in a filter 32, for example, a PT1 filter. The filter constant is greater than or equal to zero in this case. The output variable of the filter 32 is the set coolant temperature TKM(SL). At a point A, a coolant temperature control deviation dTKM is computed from the set coolant temperature TKM(SL) and the actual coolant temperature TKM (IST). The coolant temperature control deviation dTKM is the input variable of the coolant temperature limit controller 33. The coolant temperature limit controller 33 is preferably realized as a PI controller, but a PID controller or a PIDT1 controller would also be possible. To improve the controller dynamics, a proportional coefficient kp for computing the P component can be computed as a function of the coolant temperature control deviation dTKM. In this case, the proportional coefficient kp is then computed from the sum of a predetermined, static proportional coefficient and a dynamic proportional coefficient kpDYN2. The dynamic proportional coefficient kpDYN2 is computed by a unit 34.

To ensure that the transition from the charge air temperature controller 27 to the coolant temperature limit controller 33 takes place quickly and without any problems, the I component of the coolant temperature limit controller 33 is computed as follows:

First, the coolant temperature control deviation dTKM is compared with the limiting value GW. This limiting value GW can be preset, is positive, and has a value of, for example, 2° C. If the coolant temperature control deviation dTKM is greater than or equal to this limiting value GW, then the actual coolant temperature TKM(IST) still differs from the first set coolant temperature TKM(SL1), i.e., the maximum coolant temperature, by at least 2° C. If the charge air temperature controller 27 in the preceding scanning step (FIG. 2: deadtime element 24) was dominant (RM1 set), then the I component is now set to the value of the first correcting variable SG1, which is computed by the charge air temperature controller 27. If this condition is not satisfied, then the I component is limited to the value of the label WERT according to formula 1. If the coolant temperature control deviation dTKM is less than the limiting value GW, i.e., less than 2° C., then the I component of the coolant temperature limit controller 33 is likewise no longer set but rather is only limited and thus can run freely. As a result, the transition from the charge air temperature controller 27 to the coolant temperature limit controller 33 and vise versa is free of discontinuities. The smaller the limiting value GW is selected, the faster the transition from the charge air temperature controller 27 to the coolant temperature limit controller 33 occurs. As long as the I component of the coolant temperature limit controller 33 is set, the second correcting variable SG2 of the coolant temperature limit controller 33 differs from the first correcting variable SG1 of the charge air temperature controller 27 only by the P component of the coolant temperature limit controller 33. The smaller the limiting value GW is selected, the smaller the P component of the coolant temperature limit controller 33 is when its I component starts to run freely again, i.e., it is limited instead of set. In this case, the coolant temperature limit controller 33 already takes control at a small negative coolant temperature control deviation dTKM and becomes dominant for the map-controlled thermostatic valve. The transition to the coolant temperature limit controller 33 thus occurs faster, since the coolant temperature limit controller 33 becomes dominant even when the actual coolant temperature TKM(IST) overshoots the set coolant temperature TKM(SL) only slightly.

The output variable of the coolant temperature limit controller 33 is labeled in FIG. 4 with the reference symbol S3. This corresponds to the bypass coolant flow that is to be set. The limiter 35 then limits this below by zero and above according to formula 1. Therefore, the upper limiting value of the limiter 35 corresponds to the label WERT.

If a failure of the charge air temperature sensor is detected, then, as described above in connection with FIG. 2, the first switch (FIG. 2: SR1) and the third switch SR3 simultaneously change their switch positions. In FIG. 4, therefore, the third switch SR3 changes to the position indicated by the broken line. In this position, a second set coolant temperature TKM (SL2) is computed by a second engine map 43. In other words, in the event of failure of the charge air temperature sensor, a switch is made from the first engine map 31 to the second engine map 43. The input variables of the second engine map 43 are again the engine speed nMOT and the power-determining signal ve. In contrast to the first engine map 31, no maximum values are stored in the second engine map 43 but rather secure, steady-state values that correspond to the values of the engine map 25 in FIG. 3, since with the coolant temperature limit controller now dominant, exclusively the coolant temperature is automatically controlled. In the event of a failure of the charge air temperature sensor, the I component of the coolant temperature limit controller is no longer set but rather is limited to the upper limiting value WERT. It can thus run freely.

FIG. 5 shows a block diagram of the computing unit 20. The input variables are the resultant correcting variable SGR, an emergency value MAX, the coolant temperature TKM, the engine speed nMOT, and the battery voltage UB. The output variable is the control signal PWM for controlling the map-controlled thermostatic valve. The elements of the computing unit 20 are a first functional block 36 for computing a set thermostat displacement sTH(SL), a fourth switch SR4, a second functional block 37 for computing a set voltage U(SL) from the set thermostat displacement sTH(SL), and a third functional block 38 for converting the set voltage U(SL) to the control signal PWM. The first functional block 36 uses a mathematical function to compute the set thermostat displacement sTH(SL) from the resultant correcting variable SGR as a function of the engine speed nMOT. In a simple embodiment, a linear equation for a decreasing straight line is stored as the mathematical function. A first vertex of the straight line is based on the fact that at the maximum set thermostat displacement sTH(SL), the map-controlled thermostatic valve is completely open, and thus the set bypass coolant flow is zero. A second vertex of the straight line is based on the fact that at a set thermostat displacement sTH(SL) of zero, the map-controlled thermostatic valve is completely closed, and the set bypass coolant flow is at a maximum. The maximum set bypass coolant flow depends on the engine speed nMOT and is computed according to formula 1, in which WERT represents the maximum set bypass coolant flow.

The second functional block 37 converts the set thermostat displacement sTH(SL) to a set voltage U(SL). The physical behavior of the map-controlled thermostatic valve is as follows: If a certain voltage is applied to the map-controlled thermostatic valve at a certain coolant temperature, a certain thermostat displacement is obtained. If the temperature of the coolant changes, or if a different voltage is applied, a different thermostat displacement is obtained. This relationship can be described in the form of a 3D engine map as: sTH(SL)=f (TKM, U(SL)), where TKM is the coolant temperature, U(SL) is the set voltage, and sTH(SL) is the set thermostat displacement. To automatically control the charge air temperature TLL or the coolant temperature TKM, this engine map must be inverted. The inverse thermostat engine map can be described in the following form: U(SL)=f[TKM, sTH (SL)].

In this inverse thermostat engine map, the set voltage U(SL) is thus computed as a function of the coolant temperature TKM and the set thermostat displacement sTH(SL). The heat input of the heating element into the expanding material element of the map-controlled thermostatic valve depends on the flow rate of the coolant. If the coolant flows faster, then the heat input into the expanding material element is possibly somewhat lower. The flow rate of the coolant in turn depends on the engine speed, since the coolant pump (14 in FIG. 1) is driven by the crankshaft of the internal combustion engine. The inverse thermostat engine map is denoted by reference number 39. Due to the dependence on engine speed, a speed-dependent correction curve 40 is connected on the output side of the inverse thermostat engine map 39. The output variable of the second functional block 37 is the set voltage U(SL).

In the third functional block 38, the set voltage U(SL) is assigned a control signal PWM for acting on the map-controlled thermostatic valve. For this purpose, a computing unit 41 converts the set voltage U(SL) to the duty cycle of a PWM signal as a function of the battery voltage UB. The output variable corresponds to the signal PWM1 and is defined in the unit percent. Since the resistance of the heating element in the map-controlled thermostatic valve depends on the temperature of the coolant, and a maximum output power of the output stage in the electronic engine control unit may not be exceeded, the signal PWM1 is limited by a limiter 42 as a function of the battery voltage UB and the coolant temperature TKM. A suitable 3D engine map is stored in the limiter 42. The output signal of the third functional block 38 is the control signal PWM, with which the thermostatic valve is controlled.

During normal operation, i.e., the signals of the charge air temperature sensor and the coolant temperature sensor are error-free, the fourth switch SR4 is in the position indicated by a solid line. In this position, the set thermostat displacement sTH(SL) corresponds to the value computed by the first functional block 36. If a failure of the charge air temperature sensor or the coolant temperature sensor is now detected, i.e., a single fault, the fourth switch SR4 remains in the illustrated position. If, on the other hand, a double fault is detected, i.e., both the charge air temperature sensor and the coolant temperature sensor are defective, the fourth switch SR4 switches to the position indicated by the broken line. In this position, the set thermostat displacement sTH(SL) is set to the emergency value MAX, which initiates a maximum control signal PWM and completely opens the map-controlled thermostatic valve. The greatest possible cooling capacity is thus adjusted.

Figure 6A:
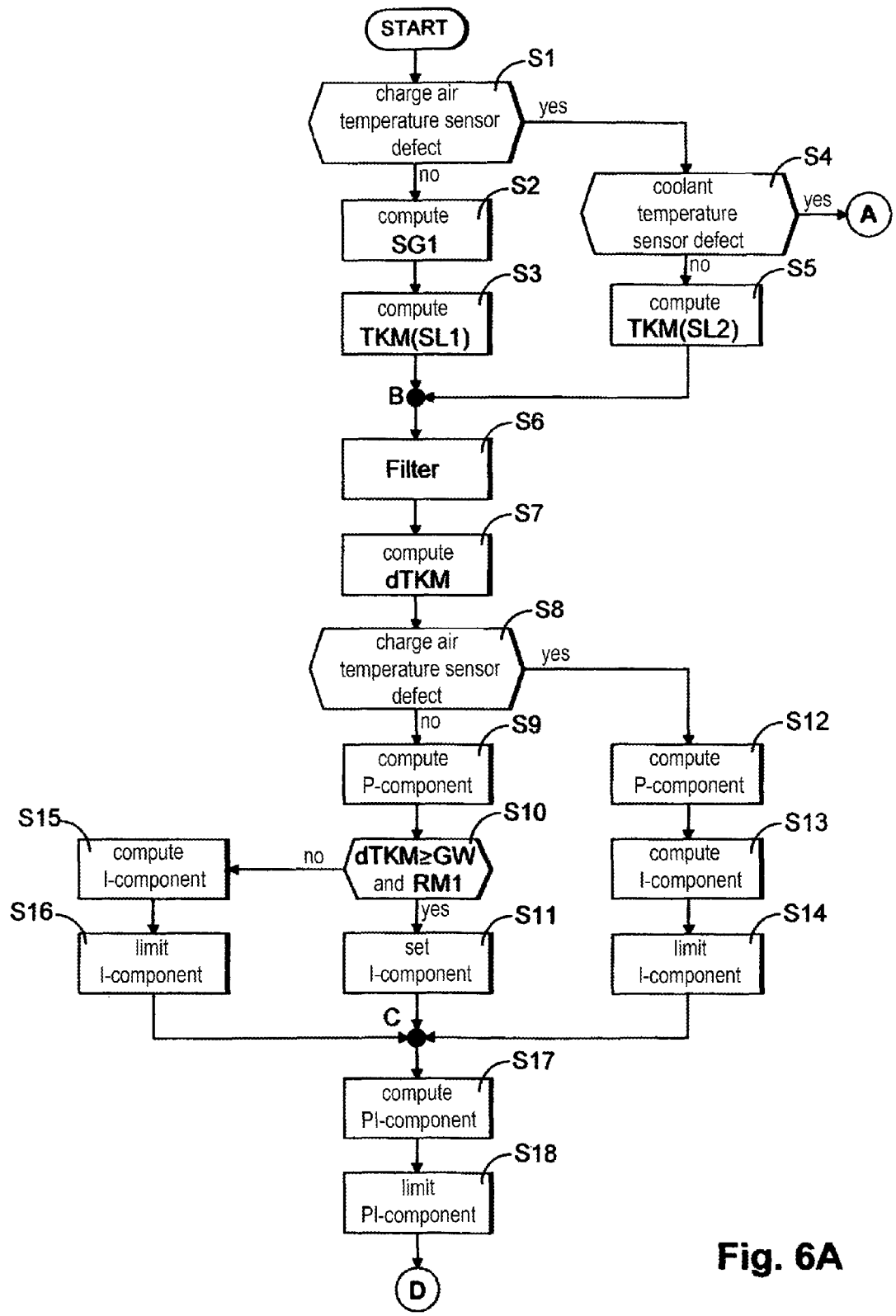
FIG. 6 shows a program flowchart (FIGS. 6A and 6B).
Figure 6B:
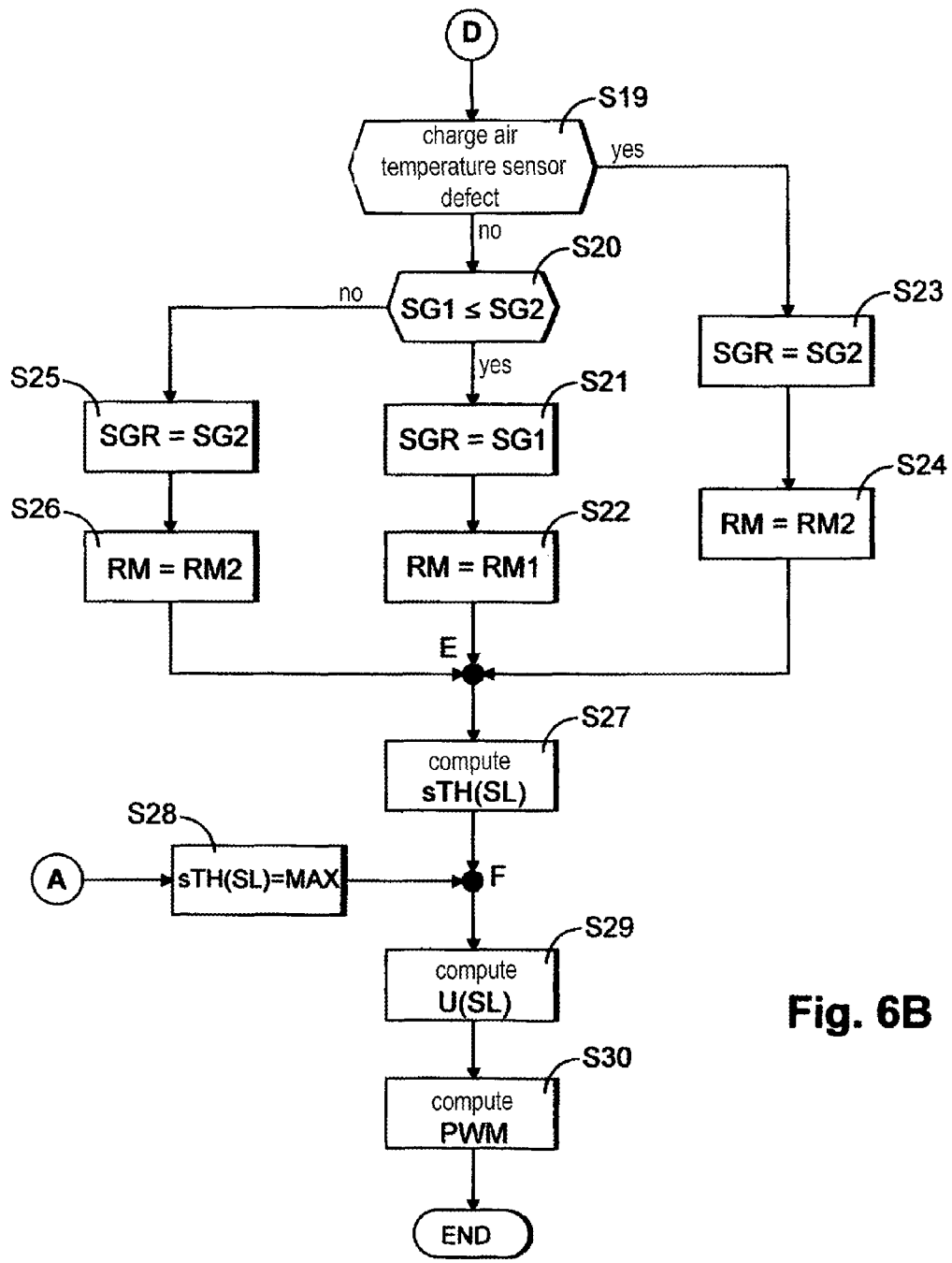

FIGS. 6A and 6B show a program flowchart. At S1 a check is made to determine whether a failure of the charge air temperature sensor has occurred. If the charge air temperature sensor is intact, the program runs through the routine with the steps S2 to S18 shown in FIG. 6A and the steps S19 to S30 shown in FIG. 6B. If the charge air temperature sensor is defective, the program runs through the routine with the steps S4 and S5, and if the coolant temperature sensor is also defective, program control passes to the subroutine A and the steps S28 to S30 in FIG. 6B.

If nondefective function of the charge air temperature sensor was detected at S1 (query result at S1: no), then at S2 the first correcting variable SG1 is computed by the charge air temperature controller on the basis of the deviation of the set charge air temperature from the actual charge air temperature. At S3 the first set coolant temperature TKM(SL1) is computed by the first engine map (FIG. 4: 31). The permissible maximum values of the coolant temperature are stored in the first engine map. The program then continues at point B and with step S6. On the other hand, if a failure of the charge air temperature sensor was detected at S1 (query result at S1: yes), then a check is made at S4 to determine whether the coolant temperature sensor is free of defects. If only a single fault is present, i.e., only the charge air temperature sensor is defective (query result at S4: no), then at S5 a change is made from the first engine map to the second engine map (FIG. 4: 43) to compute a second set coolant temperature. In contrast to the first engine map, no maximum values are stored in the second engine map but rather values that allow safe automatic control of the coolant temperature. This routine is then continued at point B and at step S6. If, on the other hand, a double fault is determined at S4, i.e. both the charge air temperature sensor and the coolant temperature sensor have failed (query result at S4: yes), control of the program is transferred to point A, and the program continues in the program flowchart of FIG. 6B at point A.

At S6 the first set coolant temperature TKM(SL1) previously computed at S3 or the second set coolant temperature TKM(SL2) computed at S5 is filtered. At S7 the coolant temperature control deviation dTKM is then computed from the actual coolant temperature TKM(IST) and the set coolant temperature TKM(SL). At S8 another query is performed to determine whether the charge air temperature sensor is defective. If this is not the case (query result at S8: no), then at S9 the P component of the coolant temperature limit controller is computed from the coolant temperature control deviation dTKM and the proportional coefficient kp. At S10 a check is made to determine whether the coolant temperature control deviation is greater than or equal to a limiting value GW, for example, 2° C., and whether the first controller mode RM1 was set during the last scanning step. This query is positively fulfilled only if the charge air temperature controller is dominant for the map-controlled thermostatic valve and at the same time the actual coolant temperature TKM(IST) is less than the set coolant temperature TKM(SL), i.e., it is within the permissible range. If this is the case (query result at S10: yes), then at S11 the I component of the coolant temperature limit controller is set to the first correcting variable SG1, which is computed by the charge air temperature controller. The program then continues at point C and step S17. If, on the other hand, the condition checked at S10 is not satisfied (query result at S10: no), then at S15 the I component of the coolant temperature limit controller is no longer set to the value of the first correcting variable SG1, but rather the I component is computed as a function of the coolant temperature control deviation dTKM, the proportional coefficient kp, and an integral-action time. In this case, the I component of the coolant temperature limit controller can run freely. At S16 the I component is limited to an upper limiting value, which is computed according to formula 1. The program then continues at point C and step S17.

If the check at S8 reveals that the charge air temperature sensor is defective (query result at S8: yes), then at S12 the P component of the coolant temperature limit controller is computed from the coolant temperature control deviation dTKM and the proportional coefficient kp. At S13 the I component of the coolant temperature limit controller is computed as a function of the coolant temperature control deviation dTKM, the proportional coefficient kp, and an integral-action time. At S14 the I component is then limited to the label WERT according to formula 1, and the program then continues at point C and step S17.

At S17 the PI component of the coolant temperature limit controller is computed by adding the P component and the I component to each other. At S18 the PI component is then limited according to formula 1, in which the label WERT represents the limiting value. The value of the limited PI component corresponds to the second correcting variable SG2. The program then continues at point D in FIG. 6B.

At S19 a check is again made to determine whether the charge air temperature sensor is defective. If this is not the case (query result at S19: no), then at S20 the value of the first correcting variable SG1 and the value of the second correcting variable SG2 are compared with each other by the minimum value selector (FIG. 2: 19). The controller whose correcting variable has the smaller value is dominant for the map-controlled thermostatic valve. If the first correcting variable SG1 is less than or equal to the second correcting variable SG2 (query result at S20: yes), then at S21 the resultant correcting variable SGR is set to the value of the first correcting variable SG1. At S22 the first controller mode RM1 is set, and the program then continues at point E and step S27. If, on the other hand, the first correcting variable SG1 is greater than the second correcting variable SG2 (query result at S20: no), then at S25 the resultant correcting variable SGR is set to the value of the second correcting variable SG2, at S26 the second controller mode RM2 is set, and then the program continues at point E and step S27. On the other hand, if the check at S19 reveals that the charge air temperature sensor is defective (query result at S19: yes), then at S23 the resultant correcting variable SGR is set to the value of the second correcting variable SG2. At S24 the second controller mode RM2 is set with the coolant temperature limit controller dominant, and the program continues at point E and step S27. At S27 the set thermostat displacement sTH(SL) is computed from the resultant correcting variable SGR, and the program continues at point F and S29. At S29 the set voltage U(SL) is computed by the computing unit (FIG. 2: 20), and at S30 the control signal PWM for acting on the map-controlled thermostatic valve is determined.

If a double fault was determined at S4 in FIG. 6A, i.e., both the charge air temperature sensor and the coolant temperature sensor have failed, program control is transferred to point A in FIG. 6B. At S28, as described above in connection with FIG. 5, the set thermostat displacement sTH(SL) is set to the emergency value MAX by the fourth switch SR4. The program then continues at point F and step S29. At S29 the maximum set voltage is determined, and at S30 the maximum control signal PWM is determined. The map-controlled thermostatic valve is completely opened by the maximum control signal to establish a maximum cooling capacity. The program then ends.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A method for automatically controlling an internal combustion engine, comprising the steps of:

setting, during normal operation in a first controller mode (RM1), a charge air temperature controller as dominant for a map-controlled thermostatic valve for automatically controlling charge air temperature (TLL), or, setting during normal operation in a second controller mode (RM2), a coolant temperature limit controller as dominant for the map-controlled thermostatic valve for automatically controlling coolant temperature (TKM);

setting the second controller mode (RM2) with the coolant temperature limit controller dominant if a charge air temperature sensor fails; and setting the first controller mode (RM1) with the charge air temperature controller dominant if a coolant temperature sensor fails.

2. A method in accordance with claim 1, including dividing a coolant flow upstream of a recooler into a recooler coolant flow and a bypass coolant flow as a function of the position of the map-controlled thermostatic valve, and, downstream of the recooler, determining the temperature of a charge air cooler coolant flow from the combined fractions of the recooler coolant flow and the bypass coolant flow to control the charge air temperature (TLL) or to control the coolant temperature (TKM).

3. A method in accordance with claim 2, including, during normal operation, computing a first set coolant temperature (TKM(SL1)) as a reference input for the coolant temperature limit controller by a first engine map, and if a failure of the charge air temperature sensor occurs, charging a second engine map for computing a second set coolant temperature (TKM(SL2)), and setting the second set coolant temperature (TKM(SL2)) as the determining reference input for the coolant temperature limit controller.

4. A method in accordance with claim 3, wherein the second set coolant temperature (TKM(SL2)) is determined by the second engine map as a function of engine speed (nMOT) and a power-determining signal (ve).

5. A method in accordance with claim 3, including limiting an I component of the coolant temperature limit controller as a function of the engine speed (nMOT) after the change to the second engine map has been made.

6. A method in accordance with claim 2, including completely opening the map-controlled thermostatic valve if both the charge air temperature sensor and the coolant temperature sensor fail.

7. A method in accordance with claim 6, wherein, to effect complete opening of the map-controlled thermostatic valve, a set thermostat displacement (sTH(SL)) is set to an emergency value (MAX), from which a maximum control signal (PWM) for acting on the map-controlled thermostatic valve is computed.

* * * * *